United States Patent [19]

Sieber et al.

[11] 4,198,933
[45] Apr. 22, 1980

[54] GOVERNOR SYSTEM FOR INTERNAL COMBUSTION ENGINES

[75] Inventors: Albrecht Sieber, Böblingen; Peter Schtilzke, Oberriexingen; Peter Werner, Stuttgart, all of Fed. Rep. of Germany

[73] Assignee: Robert Bosch GmbH, Stuttgart, Fed. Rep. of Germany

[21] Appl. No.: 900,232

[22] Filed: Apr. 26, 1978

[30] Foreign Application Priority Data

May 11, 1977 [DE] Fed. Rep. of Germany ....... 2721134

[51] Int. Cl.² .......................... F02D 31/00; F02P 9/00
[52] U.S. Cl. ............................... 123/32 EA; 123/102; 123/118
[58] Field of Search ................... 123/118, 32 EA, 102

[56] References Cited

U.S. PATENT DOCUMENTS

| | | | |
|---|---|---|---|
| 3,563,219 | 2/1971 | Mieras | 123/118 |
| 3,651,793 | 3/1972 | Roth et al. | 123/102 |
| 3,738,340 | 6/1973 | Olson | 123/102 |
| 3,789,810 | 2/1974 | Sattler | 123/102 |
| 3,900,013 | 8/1975 | Vignozzi et al. | 123/32 EA |
| 3,916,865 | 11/1975 | Kiencke et al. | 123/32 EA |
| 4,075,983 | 2/1978 | Robinson | 123/32 EA |

*Primary Examiner*—Charles J. Myhre
*Assistant Examiner*—Andrew M. Dolinar
*Attorney, Agent, or Firm*—Frishauf, Holtz, Goodman & Woodward

[57] ABSTRACT

To provide for rapid interruption of the combustion process in an internal combustion engine, for example by inhibiting ignition or supply of fuel by a fuel injection system, speed pulses are integrated and the integrated signal evaluated with respect to a reference to determine whether the integrated signal, and hence the speed of the engine, exceeds a predetermined level; a timing circuit is connected to the evaluation circuit to provide a control signal for a predetermined time interval to inhibit fuel combustion of the engine for the predetermined time interval in case the speed is exceeded. If fuel injection pulses are to be inhibited, then the timing of the timing circuit is synchronized with the fuel injection pulses to provide for complete suppression thereof without pulse overlap.

7 Claims, 2 Drawing Figures

GOVERNOR SYSTEM FOR INTERNAL COMBUSTION ENGINES

Reference to related prior art:
German Disclosure Document DE-OS 23 14 447 to which U.S. Pat. No. 3,900,013, Vignozzi et al corresponds.

Reference to related application:
U.S. Ser. No. 902,420, filed May 3, 1978, ESPENSCHIED.

The present invention relates to a system to limit the speed of internal combustion engines, and more particularly to a governor system for use in automotive-type internal combustion engines which have external ignition and which may, also, have a fuel supply controlled by fuel injection pulses which, in turn, control fuel injection valves.

BACKGROUND AND PRIOR ART

It has previously been proposed—see U.S. Pat. No. 3,900,013, Vignozzie et al corresponds to German Disclosure Document DE-OS 23 14 447—to provide pulses representative of speed of an internal combustion engine, and then to integrate these pulses to obtain an integrated value which will be representative of engine speed. When the integrated value reaches a predetermined threshold level, control systems which limit the speed of the engine can be triggered or commanded to become effective. Such arrangements as proposed have the disadvantage that reliable operation of the limiting system requires an integrator with a relatively long time constant. Thus, the system cannot respond to rapid changes in speed tending to increase the speed of the engine to an undesired, or even unsafe level.

THE INVENTION

It is an object to provide a governor or speed limiting system which permits use of integrators with a short integrating time constant so that rapid speed increases to an undesired level can be quickly recognized and corrective action initiated.

Briefly, pulses are derived from the engine in synchronism with rotation thereof which have a recurrence rate dependent on speed and a time duration essentially independent of speed, for example by triggering a monostable multivibrator in synchronism with revolutions of the engine, providing output pulses of essentially equal width but varying pulse gaps between recurrent pulses, as the speed changes. These pulses are integrated and the integrated signal is evaluated, for example by comparison in a comparator, with respect to a predetermined reference level. If the integrated signal exceeds the reference level, a timing circuit is triggered by the evaluation circuit to provide a control signal, for a predetermined time interval, to inhibit combustion in the engine for said time interval. Inhibition of combustion of the engine can be obtained, for example, by inhibiting ignition in an external ignition combustion engine or inhibiting supply of fuel. Inhiting supply of fuel is particularly simple if the engine has an electronically controlled fuel injection system.

In accordance with a preferred feature of the invention which is especially applicable if the engine has an externally controlled fuel injection system, synchronization of the timing signals with the speed signals is effected since thereby inhibition of fuel injection signals is obtained. This synchronization prevents transmission of partially chopped fuel injection pulses to the engine which may lead to damage or possibly even destruction of the engine. When applied to automotive internal combustion engines in which an exhaust gas detoxification system, including a catalytic reactor, is employed, it is generally preferred to suppress fuel supply to the engine for the predetermined time, rather than ignition pulses. Suppression of fuel supply can be readily obtained by interrupting electronic control of fuel injection valves in an electronic fuel injection system. Interrupting the supply of fuel, rather than ignition, has the advantage of a substantially smaller thermal loading of the exhaust gas detoxification catalytic reactor. If fuel continues to be supplied which is not burned in the cylinders, then the entire fuel must be burned in the catalytic reactor, which may lead to excessive heating thereof. Both the fuel supply as well as ignition can be inhibited, if desired.

Drawings, illustrating a preferred example, wherein.

Figure 1:
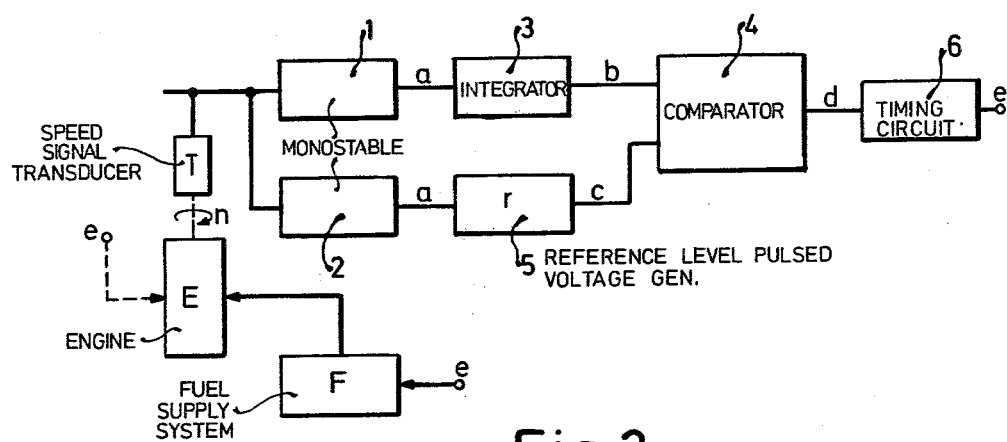
FIG. 1 is a general block diagram of the governor system.

A pulse source, for example in form of a speed signal transducer T, is driven in synchronism with the revolutions of the engine E, as schematically shown by the broken-line connection between the engine E and the speed signal transducer T. The engine is supplied with fuel from a fuel supply system F which, in a preferred form, is a gasoline fuel injection system of a suitable type. The signal derived from the transducer T is preferably wave-shaped to provide square wave output signals, for example in a Schmitt trigger circuit, and applied to two timing circuits 1, 2 which, in a simple and preferred form, are monostable flip-flops or multivibrator circuits. The first timing monostable multivibrator 1 provides its pulses to an integrator 3. The integrator 3 which, in a simple form is an R/C circuit, is connected to one input of a comparator 4.

The signals from the transducer T, wave-shaped as above described, are also connected to a second monostable multivibrator 2, the output pulses of which are connected to a reference level pulsed voltage generator 5. This circuit provides a reference level voltage in pulses, that is, only when commanded or triggered by pulses from the monostable circuit 2. The output from circuit 5 is connected as a reference input to comparator 4. The output from comparator 4, which will be in pulse form, is connected to a timing circuit 6 which, for example, may also be a monostable multivibrator. The output signal from the timing circuit 6 is available at a terminal e which can be applied to the engine E to suppress fuel injection pulses, for example to the fuel injection system F, and additionally, but not necessarily, also to the engine E to suppress ignition pulses. Since additional suppression of ignition pulses may not be necessary, the additional connection is shown in broken line. Alternatively, only the connection to suppress the ignition pulses can be used although, if the engine does have a fuel injection system, interruption of fuel supply is preferred for the protection of possible exhaust gas catalytic reactors.

Figure 2:
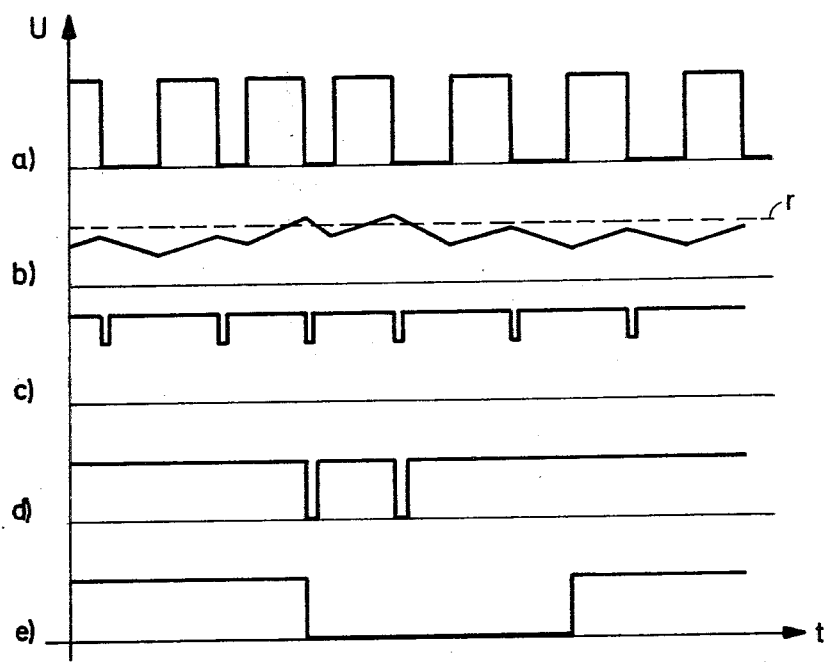
FIG. 2 is a series of graphs used in explaining the operation of the system.

Operation, with reference to FIG. 2: The speed pulses derived from transducer T are transformed in the monostable circuits 1, 2 into pulses shown in graph a of FIG. 2. The pulse duration of these pulses is equal—determined by the unstable time of the monostable circuits 1, 2, respectively; the gaps between pulses vary as the speed changes. Thus, the cyclical repetition rate of the pulses will be inversely proportional to speed; the pulse time will be constant or uniform. The pulse train as illustrated in graph a of FIG. 2 is integrated in the integrator 3. If the speed increases to an excessive level, then the reverse integration or negative integration during pulse gaps is of lesser duration than the duration of positive integration during the occurrence of the pulses, so that the overall level at the integrator rises. The voltage at the integrator, seen in graph b of FIG. 2, will reach higher and higher levels until it passes through a threshold level indicated by the broken line r. The pulsed reference level voltage generator provides output pulses in synchronism with the pulses from the monostable circuit 2, as seen in graph c. The reference level r is compared in comparator 4, in accordance with the pulses derived from the reference level pulsed voltage generator 5, so that the output from comparator 4 will be sharp pulses, synchronized by the voltage generator 5, and as seen in graph d of FIG. 2. The pulses of the graph d of FIG. 2 are connected to the timing circuit 6 which is SET by each one of the pulses. The timing circuit provides signals as seen in graph e which suppress ignition or fuel injection pulses in a fuel injection fuel supply system. These pulses are applied to the fuel supply system F, or to the ignition system at the respective terminal e, or to both. The time duration of the timing circuit 6 is so adjusted that it provides a signal having at least a length or duration which corresponds to the cycling duration of the signal from the monostable circuits 1, 2, that is, the signal of graph a of FIG. 2, at maximum permissible speed or at maximum fuel injection pulse duration of an electronic fuel injection system. The timing circuit 6 thus interrupts operation of the engine E under power even upon momentary or short time transient excessive speed occurrences. Preferably, if a fuel injection system is used, the fuel supply is interrupted for a predetermined time interval, especially for the time interval of at least one fuel injection pulse, of maximum length, even upon momentary excess speed.

The integrator 3 has the effect that exact time synchronism between the initiation of speed limiting or speed governing and the initiation of a fuel injection pulse, occurring, for example, in synchronism with the negative flank of a trigger pulse, will be lost. It is thus possible that the speed limiting system which would use only the components 1, 3, 4 and 6 would chop fuel injection pulses if the governing system senses excess speed. Chopping fuel injection pulses, however, may have as a result that unburned hydrocarbons will occur in the exhaust gases from the engine in excessive amounts. This is particularly so if ignition is also interrupted. In accordance with a feature of the invention, therefore, the output from the comparator 4 is synchronized by the reference level pulsed voltage generator 5 forming, simultaneously, a reference source for the comparator and a source of synchronization pulses. Of course, the function of reference and synchronization can be divided and separately applied to the comparator. Also, the voltage generator 5 can be triggered directly from the monostable circuit 1. The monostable circuit 1, forming a timing circuit and preferably also a monostable flip-flop provides pulses of short duration, for example with the trailing flank of the speed pulses from transducer T. These pulses then control the reference level pulsed voltage generator. This generator 5, in its most simple case, is a voltage divider formed of two resistors which are pulsed by the output from the monostable circuit 2. These pulses can, of course, also be derived from the monostable circuit 1. In a preferred example, the reference voltage source provides a signal close to that of supply voltage, for example of controlled potential, if no signal is derived from the monostable circuit 2; the reference voltage source does provide a reference voltage, however, when the timing circuit 2, formed by the monostable multivibrator, provides a signal at its output. The polarity of the supply voltage, then, can be selected at random. The signal provided by the reference voltage pulsed voltage generator 5 is illustrated in graph c of FIG. 2. Comparator 4 then can provide a signal only if the reference voltage input has a reference potential appear thereat. This simple arrangement prevents chopping of fuel injection pulses or of ignition pulses since the output from comparator 4, which sets the timing circuit 6, will have pulses appear thereat which are in synchronism with the speed pulses derived from transducer T, and such other wave-shaping circuits as are connected thereto and which are synchronized with ignition or fuel injection pulses, or both.

Various changes and modifications may be made within the scope of the inventive concept.

An arrangement to control fuel supply in a carburetor supplied Otto-type engine is disclosed in referenced application Ser. No. 902,420, filed May 3, 1978, Espenschied, the disclosure of which is hereby incorporated by reference.

We claim:

1. Governor system for an internal combustion engine (E) having means (T,1) providing electrical pulses in synchronism with rotation of the engine and having a recurrence rate dependent on speed and a time duration independent of speed;

integrating means (3) integrating said pulses and deriving an integrated signal representative of speed;

a pulsed reference level voltage generator means (5) connected and controlled to provide a pulse reference signal having a reference level and being pulsed in synchronism with rotation of the engine;

evaluation means (4) controlled by the pulsed reference signal and evaluating said integrated signals with respect to said pulsed reference signal to determine whether the integrated signal, and hence the speed of the engine, exceeds a predetermined level, and a timing circuit (6) connected to and controlled by said evaluation means (4) and providing a control signal the initiation of which is synchronized with the pulsed reference signal and hence with rotation of the engine for a predetermined time interval to inhibit fuel combustion in the engine for said predetermined time interval if said predetermined level is exceeded.

2. System according to claim 1, wherein said evaluation means comprises a comparator.

3. System according to claim 1, wherein the timing circuit (6) provides said control signal to the engine in a form effecting interruption of fuel supply to the engine.

4. System according to claim 3, wherein said evaluation means comprises a comparator (4).

5. System according to claim 1, wherein the engine has an electronically controlled fuel injection system; and wherein said control signal from the timing circuit (6) is connected to said fuel injection system to inhibit generation of an injection event.

6. System according to claim 5, wherein said engine is an external ignition engine; and wherein said timing circuit (6) provides said control signal to the ignition system of said engine to inhibit an ignition event.

7. System according to claim 1, wherein said engine is an external ignition engine; and wherein said timing circuit (6) provides said control signal to the ignition system of said engine to inhibit an ignition event.

* * * * *